(12) United States Patent
Strandborg

(10) Patent No.: US 12,313,936 B1
(45) Date of Patent: May 27, 2025

(54) MULTISCOPIC DISPLAY USING MULTISCOPIC OPTICAL ELEMENT WITH MULTIPLE LIQUID CRYSTAL LAYERS

(71) Applicant: Distance Technologies Oy, Helsinki (FI)

(72) Inventor: Mikko Strandborg, Hangonkylä (FI)

(73) Assignee: Distance Technologies Oy, Helsinki (FI)

( * ) Notice: Subject to any disclaimer, the term of this patent is extended or adjusted under 35 U.S.C. 154(b) by 0 days.

(21) Appl. No.: 19/068,113

(22) Filed: Mar. 3, 2025

(51) Int. Cl.
    *G02F 1/13357* (2006.01)
    *G02B 30/33* (2020.01)
    *G02F 1/1347* (2006.01)
    *G06F 3/01* (2006.01)
    *G09G 3/00* (2006.01)
    *G09G 3/36* (2006.01)

(52) U.S. Cl.
    CPC ....... *G02F 1/133606* (2013.01); *G02B 30/33* (2020.01); *G02F 1/1347* (2013.01); *G06F 3/013* (2013.01); *G09G 3/003* (2013.01); *G09G 3/36* (2013.01); *G09G 2320/0209* (2013.01); *G09G 2320/0233* (2013.01); *G09G 2320/0257* (2013.01); *G09G 2354/00* (2013.01)

(58) Field of Classification Search
    CPC . G02F 1/133606; G02F 1/1347; G02B 30/33; G06F 3/013; G09G 3/003; G09G 3/36; G09G 2320/0209; G09G 2320/0233; G09G 2320/0257; G09G 2354/00
    See application file for complete search history.

(56) References Cited

U.S. PATENT DOCUMENTS

2020/0336723 A1\* 10/2020 De Jong .............. H04N 13/327
2021/0281827 A1\* 9/2021 D'Annunzio ........ H04N 13/398

\* cited by examiner

*Primary Examiner* — Matthew A Eason
*Assistant Examiner* — Chayce R Bibbee
(74) *Attorney, Agent, or Firm* — Ziegler IP Law Group, LLC.

(57) ABSTRACT

A display device includes a first liquid crystal (LC) layer and a second LC layer arranged between a backlight unit and a linear polarizer, and a multiscopic optical element arranged between the first LC layer and the second LC layer. Drive signals for LC cells of the first LC layer and the second LC layer are generated, based on corresponding images to be presented to each eye of each individual user, a relative location of each eye with respect to an image plane of the display device, and relative positions of the LC cells of the first LC layer and the second LC layer with respect to multiscopic cells of the multiscopic optical element. The LC cells are controlled using the drive signals, to adjust a polarization of light passing therethrough, for producing a synthetic light field presenting the corresponding images to each eye of each individual user.

18 Claims, 3 Drawing Sheets

MULTISCOPIC DISPLAY USING MULTISCOPIC OPTICAL ELEMENT WITH MULTIPLE LIQUID CRYSTAL LAYERS

TECHNICAL FIELD

The present disclosure relates to multiscopic display systems that integrate a multiscopic optical element between stacked liquid crystal layers. The present disclosure also relates to methods for displaying via such multiscopic display systems.

BACKGROUND

Autostereoscopic and multiscopic displays have traditionally relied on lenticular arrays or parallax barriers to direct light towards different viewing directions. Typically, autostereoscopic and multiscopic displays must be tuned for a specific viewing distance range to ensure proper stereo image separation. More specifically, such displays must be calibrated so that the maximum stereo separation aligns with an expected inter-pupillary distance (IPD) at a typical viewing distance.

For example, in a lenticular array-based display, where a single lenticular lens spans multiple display pixels in a horizontal direction, each sub-pixel or pixel underneath a lenticular lens is visible in a specific viewing direction. However, due to the periodic nature of the lenticular structure, the same pixel is also simultaneously visible in additional viewing directions through neighbouring lenticular lenses. This results in repeating visibility zones, where a single sub-pixel or pixel can appear in multiple locations at different viewing angles. If the angle between these repeating viewing directions is A, the display is typically tuned so that an angular separation between a first eye and a second eye of a user is A/2, ensuring maximum stereo separation. Alternatively, the angular separation can be any integer multiple of (n+0.5)*A, meaning that both eyes perceive the same pixel through different lenticular lenses.

However, this requires careful calibration, as misalignment can cause both eyes to perceive the same underlying pixel, eliminating stereo separation and degrading a three-dimensional (3D) effect.

Furthermore, in multi-user scenarios, user positions vary dynamically, making it impossible to maintain a fixed, conflict-free pixel allocation for each user. This leads to viewing conflicts, where multiple users see the same pixel through different lenticulars, resulting in unintended overlap or crosstalk. These limitations highlight the fundamental challenges of traditional lenticular-based systems in achieving robust, scalable, and conflict-free multi-user 3D displays.

In an attempt to address some of these limitations, U.S. Pat. No. 12,113,956 B1 (hereinafter referred to as "the prior system") proposed a display utilizing stacked liquid crystal (LC) layers to dynamically modulate light polarization. By placing a first LC layer and a second LC layer in sequence and controlling them with precise drive signals, the prior system aimed to create a synthetic light field that could direct light toward specific user viewpoints, without a need for a multiscopic optical element (such as a lenticular array or a parallax barrier). However, this prior system faced several significant challenges:

(1) Pixel Conflicts in Multi-User Scenarios

In the prior system, light from a given LC cell in the first LC layer could pass through multiple LC cells in the second LC layer, causing overlapping viewing paths. This led to pixel conflicts, where multiple users or multiple eyes of a single user could see the same LC cell through different viewing angles. To resolve these conflicts dynamically, the system required complex drive signal computations.

(2) Computational Complexity

The prior system relied entirely on polarization control to direct light, without any physical optical element to separate viewing paths. This meant that generating the correct drive signals for each LC cell required solving interdependent linear equations for every pixel, significantly increasing computational demand. As a result, real-time rendering became impractical, particularly when multiple simultaneous users needed to be supported.

(3) No Intrinsic Light Directional Control

Unlike lenticular arrays or parallax barrier, which physically direct light to specific angles, the prior system relied solely on LC polarization modulation. This introduced higher sensitivity to manufacturing tolerances and required precise calibration to maintain correct operation. Even minor misalignment in LC layer control could lead to light leakage and unintended visibility errors, degrading image quality.

In light of the foregoing, there remains a need for a multiscopic display system that reduces pixel conflicts, minimizes computational complexity, and provides robust optical separation between viewing paths.

SUMMARY

The present disclosure seeks to provide a multiscopic display system that delivers high-resolution, artefact-free virtual content with optimal brightness and a wide field of view, while reducing pixel conflicts, minimizing computational complexity, and ensuring robust optical separation between viewing paths. The aim of the present disclosure is achieved by multiscopic display systems and methods that integrate a multiscopic optical element between stacked liquid crystal layers, which physically directs light paths to mitigate pixel conflicts and computational overhead, as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1A:
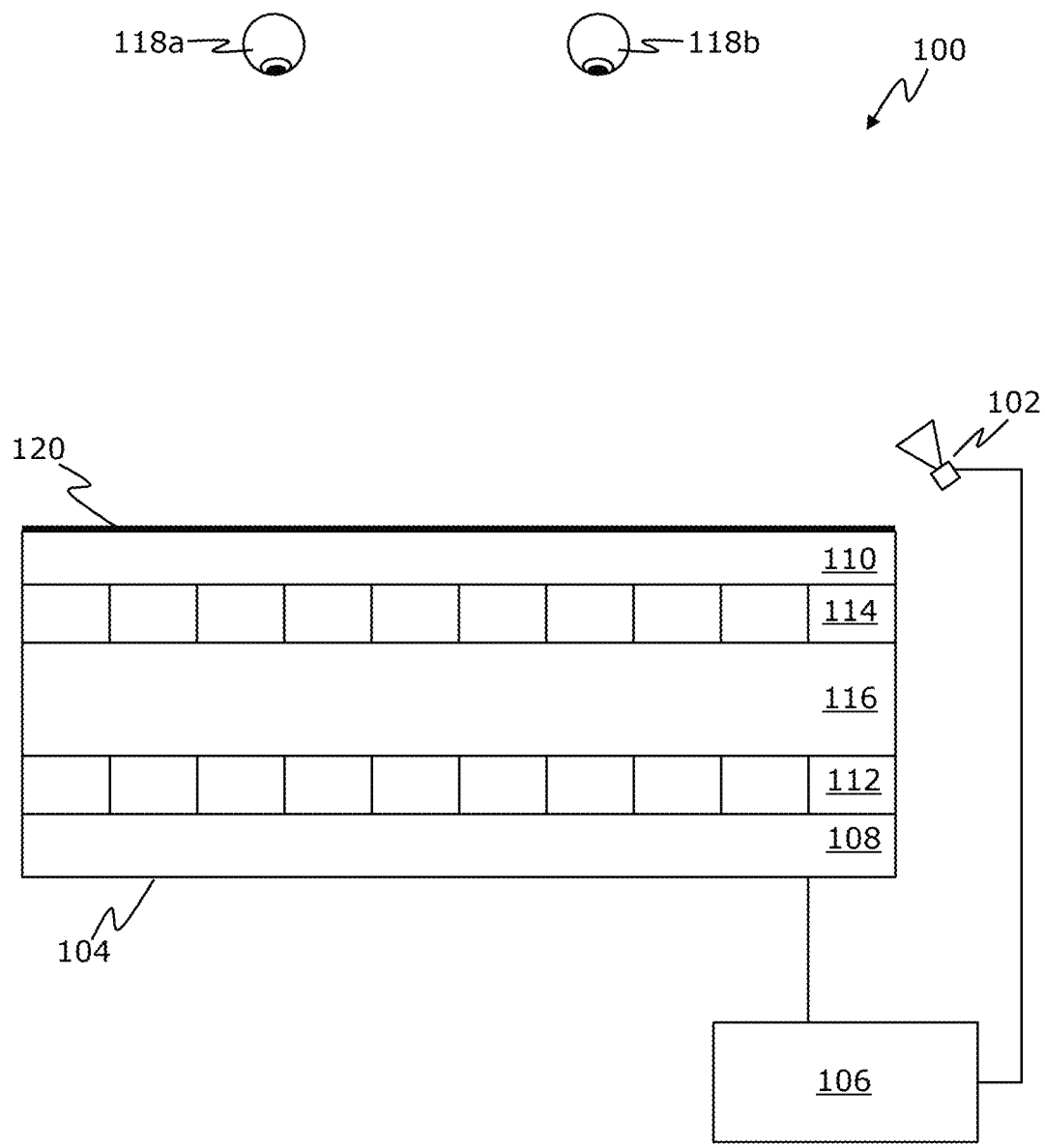
FIG. 1A is a schematic illustration of a multiscopic display system that integrates a multiscopic optical element between stacked liquid crystal layers, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a multiscopic display system comprising:
- a tracker;
- a display device comprising:
    - a backlight unit;
    - a linear polarizer arranged on an optical path of the backlight unit;
    - a first liquid crystal (LC) layer and a second LC layer arranged between the backlight unit and the linear polarizer, the second LC layer being in a proximity of the linear polarizer, each of the first LC layer and the second LC layer comprising a plurality of LC cells; and
    - a multiscopic optical element arranged between the first LC layer and the second LC layer, the multiscopic optical element comprising a plurality of multiscopic cells; and
- at least one processor configured to:
    - determine a relative location of each eye of each individual one of at least one user with respect to an image plane of the display device, by utilising the tracker;
    - generate or retrieve a corresponding image to be presented to each eye of each individual one of the at least one user, based on the relative location of each eye of each individual one of the at least one user with respect to the image plane; and
    - generate drive signals for the LC cells of the first LC layer and the LC cells of the second LC layer, based on corresponding images to be presented to different eyes of each individual one of the at least one user, the relative location of each eye of each individual one of the at least one user with respect to the image plane, relative positions of the LC cells of the second LC layer with respect to the multiscopic cells of the multiscopic optical element, and relative positions of the LC cells of the first LC layer with respect to the multiscopic cells of the multiscopic optical element,
    - wherein the LC cells of the first LC layer and the LC cells of the second LC layer are controlled using the drive signals, to adjust a polarization of light passing therethrough, for producing a synthetic light field presenting the corresponding images to the different eyes of each individual one of the at least one user.

In a second aspect, an embodiment of the present disclosure provides a method comprising:
- determining a relative location of each eye of each individual one of at least one user with respect to an image plane of a display device, wherein the display device comprises a backlight unit, a linear polarizer arranged on an optical path of the backlight unit, a first liquid crystal (LC) layer and a second LC layer arranged between the backlight unit and the linear polarizer, and a multiscopic optical element arranged between the first LC layer and the second LC layer, wherein the second LC layer is in a proximity of the linear polarizer, each of the first LC layer and the second LC layer comprising a plurality of LC cells, the multiscopic optical element comprising a plurality of multiscopic cells;
- generating or retrieving a corresponding image to be presented to each eye of each individual one of the at least one user, based on the relative location of each eye of each individual one of the at least one user with respect to the image plane;
- generating drive signals for the LC cells of the first LC layer and the LC cells of the second LC layer, based on corresponding images to be presented to different eyes of each individual one of the at least one user, the relative location of each eye of each individual one of the at least one user with respect to the image plane, relative positions of the LC cells of the second LC layer with respect to the multiscopic cells of the multiscopic optical element, and relative positions of the LC cells of the first LC layer with respect to the multiscopic cells of the multiscopic optical element; and
- controlling the LC cells of the first LC layer and the LC cells of the second LC layer using the drive signals, to adjust a polarization of light passing therethrough, for producing a synthetic light field presenting the corresponding images to the different eyes of each individual one of the at least one user.

The present disclosure provides the aforementioned multiscopic display system and the aforementioned method that integrate the multiscopic optical element between the first LC layer and the second LC layer (hereinafter, "stacked LC layers"). The system delivers high-resolution, artefact-free virtual content with optimal brightness and a wide field of view, while reducing pixel conflicts, minimizing computational complexity, and ensuring robust optical separation between viewing paths. The synergistic integration of the multiscopic optical element with the stacked LC layers ensures that light is precisely directed toward separate viewing angles, preventing multiple users or different eyes of the same user from unintentionally viewing the same subpixel. The system dynamically adapts to multiple users by using the tracker to determine relative locations of their eyes, ensuring that each eye of each individual user perceives a correct image.

Additionally, the stacked LC layers, combined with polarization control, allow for precise modulation of light intensity and light direction, minimizing unintended light leakage and reducing crosstalk between different viewing zones. The alignment of the LC cells with respect to the multiscopic cells ensures efficient control over separate light paths, leading to sharper images with improved depth fidelity. A wide field of view further reduces distortions and ensures stable image perception, even with user head movements.

By incorporating the multiscopic optical element, the system offloads the computational burden that would otherwise require complex per-pixel calculations for polarization control. The drive signals for the LC cells are dynamically adjusted based on real-time eye tracking, enabling adaptive rendering with minimal processing overhead.

Furthermore, the system supports high-resolution display devices by ensuring that each LC layer operates efficiently without excessive pixel-sharing artefacts. The scalable architecture of the stacked LC layers allows optimization for various display technologies, making the system applicable to virtual reality (VR), augmented reality (AR), and multiscopic 3D displays.

Thus, the combination of the stacked LC layers, the multiscopic optical element, and real-time tracking enables a high-performance multiscopic display that enhances image quality, computational efficiency, brightness, and multi-user adaptability, while minimizing pixel conflicts and crosstalk. This results in a practical, scalable, and immersive 3D display system.

For illustration purposes, there will now be described how the aforementioned technical benefits are achieved through interaction of various components of the multiscopic display system:

(1) Tracking the Relative Locations of Users' Eyes:

The tracker is utilised to determine relative locations of the eyes of each individual user with respect to the image plane of the display device in real-time or near real-time. This enables the system to identify viewing directions dynamically, which is essential for precise light field adjustments.

(2) Generating or Retrieving the Correct Image for Each Eye:

The relative locations of the eyes serve as an input for generating or retrieving correct viewpoint-dependent images for each eye. This ensures that each eye of each individual user perceives a correct image. This supports multi-user scenarios and enhances display usability in dynamic environments.

(3) Generating Drive Signals for the LC Layers:

The drive signals are generated for the LC cells of both the first LC layer and the second LC layer based on:
  the relative locations of the eyes, ensuring correct alignment of light paths, and
  the relative positions of the LC cells with respect to the multiscopic optical element, optimizing image clarity and preventing unintended visibility.

The multiscopic cells of the multiscopic optical element are aligned with the LC cells of the second LC layer, ensuring that light paths are:
  correctly separated for distinct viewpoints, preventing overlap; and
  directed with minimal optical leakage, improving resolution and brightness.

Because the drive signals for the LC cells are precisely generated based on real-time eye tracking, the system eliminates crosstalk while expanding the effective viewing angles from which users can view the virtual content.

(4) Producing the Synthetic Light Field:

The LC cells of the first LC layer modulate the polarization of the light, defining directional visibility. The LC cells of the second LC layer refine the polarization, ensuring the light is directed only to the intended viewing positions. Such a dual-layer polarization control reduces crosstalk and prevents unintended light interference between different light paths.

The alignment of the multiscopic cells with the LC cells of the second LC layer enables each LC cell to function in coordination with a corresponding multiscopic cell, optimizing image clarity while reducing computational complexity. Since light paths are physically constrained by the multiscopic optical element, the system requires fewer real-time calculations for resolving light path conflicts, making it more computationally efficient than prior systems.

The combined effect of the stacked LC layers and the multiscopic optical element results in the synthetic light field, where:
  each eye of each individual user perceives a distinct high-resolution, artefact-free image,
  light paths are accurately aligned with the viewing location and direction of each eye, improving depth perception and multi-user support.

Moreover, optionally, a width of the multiscopic cells of the multiscopic optical element lies within a predefined range from an integer multiple of a width of the LC cells in the second LC layer. This ensures that each multiscopic cell is proportionally aligned with a single LC cell or multiple LC cells of the second LC layer (depending on the implementation), allowing for a structured and predictable optical pathway. This also enhances spatial consistency in light distribution, reducing viewing inconsistencies that may arise from misalignment.

Additionally, maintaining a structured ratio between multiscopic cell width and LC cell width ensures that all LC cells (of the second LC layer) corresponding to a single multiscopic cell can be driven using the same drive signals. In such a case, a resolution of the second LC layer is lower than a resolution of the first LC layer. This approach simplifies signal computation and synchronization, eliminating the need for per-cell variations within a single multiscopic region. As a result, the system reduces computational complexity while maintaining coherent polarization modulation across aligned LC cells.

The predefined range can be expressed as a predefined percentage of the width of the LC cells in the second LC layer. This predefined percentage could lie within a range of 2% to 15%, and more optionally, within a range of 5% to 10%.

For illustration purposes, consider an example where:
  the predefined percent is 10%, and
  the width of the LC cells of the second LC layer is 50 micrometres ($\mu$m).

In this case, the predefined range is 10% of 50 $\mu$m, which equals 5 $\mu$m.

If a single multiscopic cell spans six LC cells in the second LC layer, then the width of the multiscopic cells should be approximately 300 $\mu$m (=6×50 $\mu$m).

Accordingly, the predefined range provides a tolerance for integrating the multiscopic optical element with the stacked LC layers, allowing for variability in the width of the multiscopic cells within ±5 $\mu$m of 300 $\mu$m. Thus, the width of the multiscopic cells may vary within a range of 295 $\mu$m to 305 $\mu$m, ensuring manufacturing flexibility while maintaining precise optical alignment.

Most importantly, it will be appreciated that the multiscopic display system enables advanced multiscopic display configurations, including high-resolution lenticular array-based display devices with extremely narrow lenticular pitches, where a pitch of a lenticular array is only slightly larger than a circle of confusion of a lenticular lens—for example, within a range of 3 to 5 LC cells of the first LC layer. Moreover, a lenticular height can be selected such that a first eye and a second eye of a user perceives each LC cell of the first LC layer through different lenticular lenses. This configuration allows for significantly higher resolution compared to conventional lenticular-based displays, as it is no longer necessary to ensure that each lenticular lens directs light passing through entirely separate LC cells to each eye. Even if both eyes perceive the same underlying LC cell through different lenticulars, the required stereoscopic image differentiation can be achieved through independent control of the LC cells of the second LC layer. Since each eye is guaranteed to view the LC cells of the first LC layer through different LC cells of the second LC layer, the system dynamically adjusts the polarization or intensity settings in the second LC layer to generate the appropriate image separation, maximizing resolution while maintaining multiscopic functionality.

Additionally, optionally, the LC cells of the second LC layer are aligned with the edges of the multiscopic cells of the multiscopic optical element. In some implementations, the multiscopic optical element is implemented as a lenticular array, wherein the multiscopic cells correspond to lenticular lenses of the lenticular array. In such a case, the edges of the multiscopic cells are defined by physical boundaries between adjacent lenticular lenses. In other implementations, the multiscopic optical element is implemented as a parallax barrier, wherein the multiscopic cells correspond to transparent slits of the parallax barrier. In such a case, the edges of the multiscopic cells are defined by midpoints of adjacent opaque regions that separate the transparent slits.

The aforementioned alignment primarily enhances light path separation, directional control, and signal predictability. These technical benefits manifest as follows.

First, aligning the LC cells of the second LC layer with the edges of the multiscopic cells ensures that each LC cell operates within a defined light pathway, preventing unintended light leakage between adjacent viewing paths. This structured alignment enhances directional accuracy, ensuring that light rays remain confined to their intended pathways, which is critical for reducing overlapping light paths in multi-user displays.

Second, proper edge alignment prevents adjacent multiscopic cells from unintentionally influencing the same LC cell, thereby reducing crosstalk and ghosting artefacts. This results in sharper image transitions, improving the overall clarity and separation of multi-user image projections.

Third, the second LC layer refines the polarization state of light before it exits the display device. With precise alignment at the edges, polarization transitions occur consistently, leading to more uniform contrast levels across different viewing angles.

Fourth, when the LC cells of the second LC layer align with the edges of the multiscopic cells, drive signal calculations become more structured and systematic. This simplifies real-time image processing, reducing computational complexity and enabling efficient per-cell signal generation without requiring extensive pixel-by-pixel corrections.

Fifth, when multiple LC cells of the second LC layer fall under a single multiscopic cell, all these LC cells are driven using the same drive signals. This ensures uniform light modulation across the entire multiscopic region, reducing colour and brightness inconsistencies while simplifying signal control architecture. The uniform drive signals further reduce computation overhead, as the system does not require separate drive calculations for individual LC cells within the same multiscopic zone.

Sixth, edge alignment ensures that slight variations in LC cell placement do not disrupt optical performance, maintaining consistent output quality across different display devices. This approach allows for scalability, enabling adaptation for high-resolution VR, AR, and multiscopic 3D displays with varying pixel densities and optical configurations.

Furthermore, optionally, the multiscopic optical element is a lenticular array, wherein the display device further comprises a masking layer arranged between the multiscopic optical element and the second LC layer, the masking layer comprising a plurality of masks positioned at edges of respective ones of the plurality of multiscopic cells. The masking layer can be implemented using various optical and light-absorbing materials. As an example, the masking layer can be a black matrix layer, similar to those used in LC display panels, which comprise light-absorbing materials (for example, such as carbon black) to block stray light effectively. As another example, the masking layer can be a photoresist-based patterned mask, where a high-opacity polymer coating is selectively deposited at the edges of the lenticular lenses to prevent light leakage. As yet another example, the masking layer can be a thin coating of a metallic or dielectric material (for example, such as chromium or titanium oxide), applied via photolithography to create precise optical barriers at the boundaries of the multiscopic cells. Irrespective of the implementation, the masking layer provides several technical benefits:

First, the masks at the edges of the lenticular lenses block stray light, preventing crosstalk between adjacent multiscopic zones and ensuring that each user's eye receives the correct image. This reduces ghosting, improving depth perception and visual comfort for users.

Second, by absorbing or blocking unwanted light, the masking layer enhances contrast and sharpens image boundaries. This is particularly beneficial for high-resolution displays, where precise light control is critical for maintaining artefact-free rendering.

Third, the masking layer prevents unintended light refraction at the boundaries of the lenticular lenses, allowing the lenticular array to function with higher directional precision. This results in more stable viewing angles, where slight head movements do not introduce noticeable distortions or unwanted blending between adjacent light paths.

Fourth, by blocking stray light, the masking layer helps maximize the intensity of correctly directed light paths, ensuring that more light reaches its intended destination. This leads to brighter and clearer images, improving display performance even in bright outdoor environments.

Fifth, the second LC layer typically compensates for pixel conflicts and light path inconsistencies through dynamic adjustments. With the masking layer reducing unwanted light interactions, the stacked LC layers require fewer complex drive signal corrections, leading to lower computational overhead and faster real-time processing.

Sixth, the masking layer compensates for minor misalignments between the multiscopic cells and the LC cells of the second LC layer, maintaining consistent optical performance across different units of the display.

Moreover, in some implementations, the display device can be a monochrome display. In other implementations, the display device can be a coloured display. Optionally, in such implementations, the display device further comprises a colour filter array (CFA) arranged adjacent to the first LC layer. In such a case, the LC cells of the first LC layer correspond to sub-pixels, allowing the system to display full-colour images. By "adjacent", it is meant that the CFA is arranged either before or after the first LC layer, and there is a negligible gap between the CFA and the first LC layer. A technical benefit of such an arrangement of the CFA is that there is no sub-pixel light leakage in the display device. This eliminates crosstalk and ghosting artefacts in the synthetic light field produced by the display device. By ensuring that each LC cell of the first LC layer functions as a sub-pixel having a predefined colour, the CFA enables accurate full-colour image rendering without requiring additional colour processing. This reduces computational complexity, as colour separation is handled at a hardware level rather than through real-time image processing. Furthermore, by preventing unintended light blending between adjacent sub-pixels, the CFA enhances colour accuracy, contrast, and overall image sharpness, which is particularly beneficial for high-resolution applications. Additionally, in multiscopic displays, the CFA helps maintain colour consistency across different viewing angles, reducing angular colour shifts and chromatic aberrations. The precise alignment of the CFA with the LC cells of the first LC layer ensures that each eye perceives the correct colour distribution, minimizing ghosting or colour fringing artefacts. This improves display clarity, reduces processing overhead, and ensures a stable, high-fidelity visual experience.

Alternatively, optionally, in the display device, instead of implementing the CFA, the backlight unit can be implemented as a colour-sequential backlight unit, which includes a colour wheel or a time-multiplexed arrangement of light-emitting elements to provide sequential illumination in different primary colors (for example, red, green, and blue). In such a case, the LC cells of the first LC layer do not require fixed sub-pixel colour filters, but instead modulate light dynamically in synchronization with the backlight colour cycle. This eliminates spatial colour filtering, thereby improving brightness and optical efficiency, as more backlight intensity reaches the user without absorption losses from static colour filters. Furthermore, a colour-sequential backlight unit enables higher-resolution displays, as there is no need to subdivide the first LC layer into sub-pixels, maximizing the effective resolution for each frame. Additionally, this reduces colour aliasing effects that may arise from sub-pixel structures, ensuring smoother colour transitions and improved multi-user colour consistency. By dynamically adjusting the drive signals for the LC cells in synchronization with the backlight colour cycle, the system maintains accurate colour rendering, while optimizing computational efficiency.

Furthermore, there will now be described an example implementation explaining how the drive signals can be generated. In this implementation, when generating the drive signals, the at least one processor is configured to:

for a given LC cell of the first LC layer, determine a first LC cell of the second LC layer through which light emanating from the given LC cell of the first LC layer is passing towards a first eye of a given individual one of the at least one user;

detect whether the light emanating from the given LC cell of the first LC layer simultaneously passes through a second LC cell of the second LC layer towards a second eye of the given individual one of the at least one user or a given eye of another individual one of the at least one user; and when it is detected that the light emanating from the given LC cell of the first LC layer simultaneously passes through the second LC cell of the second LC layer towards the second eye of the given individual one of the at least one user or the given eye of the another individual one of the at least one user, generate drive signals for the given LC cell of the first LC layer, the first LC cell of the second LC layer and the second LC cell of the second LC layer, based on a corresponding image to be presented to the first eye of the given individual one of the at least one user and another corresponding image to be presented to the second eye of the given individual one of the at least one user or the given eye of the another individual one of the at least one user.

The first LC cell of the second LC layer through which the light emanating from the given LC cell of the first LC layer is passing towards the first eye of the given individual one of the at least one user is determined, based on the relative location of the first eye with respect to the image plane and a position of the given LC cell in the first LC layer. This step is performed by mapping the optical path of the light, based on a viewing direction of the first eye. In this regard, the alignment of the LC cells of the first LC layer and the LC cells of the second LC layer can be analysed, using pre-calibrated geometric models or real-time calibration data that is collected during use.

In a similar manner, it is detected whether the light emanating from the same LC cell in the first LC layer also passes through the second LC cell in the second LC layer toward:

the second eye of the same user, causing unintended overlap in binocular vision; or the given eye of another user, causing multi-user interference.

When it is detected that the light emanating from the same LC cell in the first LC layer also passes through the second LC cell in the second LC layer toward the second eye of the same user or the different user's eye, it is considered as a conflict. In such a case, the drive signals are generated to resolve this conflict, based on the intended images for each affected eye, ensuring that each eye perceives the correct image without unintended blending or ghosting. In this regard, the drive signals may be generated to:

adjust polarization of the light by the given LC cell of the first LC layer as well as both the first LC cell and the second LC cell of the second LC layer, or selectively modulate LC transparency in at least one of: the first LC cell, the second LC cell of the second LC layer to suppress conflicting light paths.

It will be appreciated that the aforementioned steps have been provided with respect to the given LC cell of the first LC layer. These steps can be performed in a similar manner for other LC cells of the first LC layer, to generate the drive signals for all the LC cells of the first LC layer and all the LC cells of the second LC layer.

The aforementioned conflict detection and resolution mechanism provides several technical benefits that enhance the accuracy, efficiency, and visual quality of the multiscopic display system.

First, by detecting whether the light from the given LC cell in the first LC layer reaches multiple unintended eyes, the system prevents incorrect image perception caused by overlapping light paths. This ensures that each user's eye perceives the correct corresponding image, reducing visual confusion and unintended blending in multiscopic displays.

Second, the dynamic adjustment of polarization and transparency in both LC layers mitigates ghosting artefacts, improving image separation and clarity.

Third, the system prevents unintended overlap in binocular vision, where both eyes of the same user might see portions of the same light path. This improves stereoscopic depth perception, ensuring that 3D effects are displayed correctly without distortions.

Fourth, the detection and resolution of conflicts involving different users ensure that light paths intended for one user do not unintentionally affect another. This is particularly beneficial for multi-user autostereoscopic displays, where maintaining clear, independent images for each user is essential.

Fifth, this approach enables scalability, allowing the system to adapt to various display sizes and resolutions without extensive per-pixel recalculations.

Sixth, instead of applying complex per-pixel corrections across the entire display, the system identifies only conflicting regions and dynamically adjusts polarization or transparency where necessary. This reduces unnecessary processing, making real-time multiscopic rendering more efficient.

Seventh, by selectively adjusting polarization and LC transparency, the system blocks unwanted light paths, ensuring that each pixel contributes only to the intended image. This enhances contrast, sharpness, and overall display fidelity, improving the viewing experience.

Moreover, optionally, when generating the drive signals for the given LC cell, the first LC cell and the second LC cell, the at least one processor is configured to:
- determine, based on a first intensity value of a first pixel in the corresponding image to be presented to the first eye, a first output angle to be generated between a polarization orientation of the linear polarizer and a first polarization orientation of the light incident upon the linear polarizer after passing through the given LC cell of the first LC layer and the first LC cell of the second LC layer; and
- determine, based on a second intensity value of a second pixel in the another corresponding image to be presented to the second eye or the given eye, a second output angle to be generated between the polarization orientation of the linear polarizer and a second polarization orientation of the light incident upon the linear polarizer after passing through the given LC cell of the first LC layer and the second LC cell of the second LC layer;
- wherein the drive signals for the given LC cell, the first LC cell and the second LC cell are generated based on the first output angle and the second output angle.

In this regard, the first intensity value of the first pixel and the second intensity value of the second pixel are fetched from the corresponding image and the another corresponding image, respectively, based on a viewing direction of the first eye (from its viewing position toward the given LC cell of the first LC layer) and a viewing direction of the second eye or the given eye (from its viewing position toward the given LC cell of the first LC layer).

An overall intensity of the light passing through the linear polarizer depends on an output angle between the polarization orientation of the linear polarizer and the polarization orientation of said light. This is based on a fact that a given polarizer only allows to pass through an entirely of light whose polarization orientation is same as a given polarization orientation of the given polarizer. As an example, if a stream of photons (namely, light) has a polarization orientation that makes an angle of 45 degrees from the given polarization orientation of the given polarizer, only half of the photons would pass through the given polarizer.

By determining the first output angle and the second output angle corresponding to the first intensity value and the second intensity value, respectively, individual drive signals for the given LC cell of the first LC layer, the first LC cell of the second LC layer and the second LC cell of the second LC layer can be generated by solving two linear equations. One of the two linear equations takes into account an angle of rotation by which the given LC cell of the first LC layer is to rotate the light passing therethrough and an angle of rotation by which the first LC cell of the second LC layer is to rotate the light passing therethrough, such that these angles of rotations result in the first output angle. Another of the two linear equations takes into account an angle of rotation by which the given LC cell of the first LC layer is to rotate the light passing therethrough and the angle of rotation by which the second LC cell of the second LC layer is to rotate the light passing therethrough, such that these angles of rotations result in the second output angle.

Such an intensity-based polarization control mechanism enhances image accuracy, depth perception, and crosstalk reduction by dynamically determining output angles based on the intensity values of corresponding image pixels. By adjusting the polarization orientation of the light incident on the linear polarizer, the system ensures precise brightness reproduction, improved contrast, and minimized ghosting artefacts. This approach optimizes power efficiency by modulating polarization only where needed, while also ensuring that each eye receives the correct luminance for stereoscopic accuracy. Additionally, it enables adaptive multi-user optimization, maintaining colour consistency and visual clarity across different viewing angles, making it particularly effective for high-fidelity multiscopic displays.

Furthermore, in some implementations, both the first LC layer and the second LC layer are configured to rotate the light passing therethrough in a same direction, namely, either clockwise or anti-clockwise. In such implementations, at least one of: the first LC layer, the second LC layer can be configured to have a full range of rotation of 0 to 180 degrees. It will be appreciated that such a configuration of the at least one of: the first LC layer, the second LC layer is physically possible to create, but is not commonly manufactured by display manufacturers, because such a configuration is not required in conventional LC displays. Notably, a range of rotation of 0 to 90 degrees is sufficient for conventional LC displays, because an additional range of rotation of 90 to 180 degrees would simply re-produce same resulting light intensities that are already reproducible with the range of rotation of 0 to 90 degrees. Pursuant to the present disclosure, configuring the at least one of: the first LC layer, the second LC layer to have the full range of rotation of 0 to 180 degrees makes it possible to reach every single intensity value from an arbitrary starting orientation. In other words, if a single LC cell is configured to have a range of rotation of 0 to 90 degrees only, it may not be possible to reach every single intensity value from an arbitrary starting orientation. As an example, in a worst-case scenario, if, prior to passing through the given LC cell of the first LC layer, the light has a polarization orientation that is orthogonal to the polarization orientation of the linear polarizer, and if the given LC cell in the first LC layer is controlled to rotate the polarization orientation of the light to 45 degrees, the first LC cell in the second LC layer can be controlled to reach a total rotation range of 45 to 135 degrees only. In such a case, the second LC layer can only add light (because 45 degrees is equivalent to medium grey, 90 degrees is equivalent to full intensity, and 135 degrees is equivalent to 45 degrees).

Thus, configuring the first LC layer and the second LC layer to have the range of rotation of 0 to 90 degrees only could lead to an optimization problem where it would be required to determine a combination of rotation angles for all LC cells in both the first LC layer and the second LC layer where all LC cells emit light of intended intensity values towards all viewing directions with a minimal error. Moreover, in such a case, there may be certain combinations of intensity values that may not be simply achievable.

In other implementations, at least one of: the first LC layer, the second LC layer is configured to rotate the light passing therethrough in any direction, namely, clockwise or anti-clockwise. In other words, the at least one of: the first LC layer, the second LC layer may rotate the light in a clockwise direction at a given time instant, and may rotate the light in an anti-clockwise direction at another given time instant. In such implementations, the first LC layer and the second LC layer can be configured to have a full range of rotation of 0 to 90 degrees only. However, at least one of: the first LC layer, the second LC layer can alternatively be configured to have a full range of rotation of 0 to 180 degrees. Configuring the at least one of: the first LC layer, the second LC layer to rotate the light in any direction (namely, clockwise and anti-clockwise at different time instants) makes it possible to reach every single intensity value from an arbitrary starting orientation. Optionally, in operation, a direction in which the given LC cell of the first LC layer rotates the polarization orientation of the light is opposite to a direction in which at least one of: the first LC cell, the second LC cell of the second LC layer rotates the polarization orientation of the light. This allows for simplifying the linear equations, thereby saving processing resources of the at least one processor. This also allows for achieving accurate colour reproduction according to the corresponding image (to be presented to the first eye) and the another corresponding image (to be presented to the second eye or the given eye).

Moreover, optionally, when generating the drive signals, the at least one processor is configured to:

when it is detected that the light emanating from the given LC cell of the first LC layer does not simultaneously pass through any other LC cell of the second LC layer towards the second eye of the given individual one of the at least one user or any eye of the another individual one of the at least one user, generate drive signals for the given LC cell of the first LC layer, based on the first intensity value of the first pixel in the corresponding image to be presented to the first eye; and generate default drive signals for the first LC cell of the second LC layer.

In this regard, the drive signals are generated in a simplified manner when it is detected that the light from the given LC cell of the first LC layer does not simultaneously pass through any other LC cell in the second LC layer toward a conflicting eye. Since no conflict exists, a drive signal can be directly assigned to the given LC cell of the first LC layer based on the first intensity value of the first pixel. This ensures that the polarization and transmission properties of the given LC cell of the first LC layer correctly modulate the light for the intended eye (namely, the first eye).

In the absence of any conflict, the first LC cell of the second LC layer does not require active modulation for resolving conflicting light paths. Thus, default drive signals can be assigned to the first LC cell in the second LC layer. These default signals can be implemented as any one of:

(a) Neutral Polarization State: The first LC cell of the second LC layer is set to a polarization state that does not alter the polarization of incoming light, effectively maintaining its original polarization as defined by the given LC cell of the first LC layer.

(b) Compensatory Polarization Offset: The first LC cell is driven to a polarization state that compensates for systemic biases in the optical path, for example, such as minor birefringence effects from other display components.

(c) Time-Averaged Polarization State (Temporal Multiplexing Variant): If temporal multiplexing is used, the first LC cell may cycle between multiple predefined states to distribute potential errors across multiple frames or users. This can be done either on a per-region basis or for an entirety of the display device at once.

(d) Optimized for Linear Polarizer Orientation: The default drive signals are selected in coordination with the polarization orientation of the linear polarizer to ensure that the "off" state does not significantly affect contrast or visibility in unintended viewing zones.

The default drive signals may correspond to a polarization rotation of 0 degrees or another calibrated value optimized for display performance, accounting for factors, such as linear polarizer orientation, birefringence effects, and temporal multiplexing strategies where applicable. In general, default drive signals provide a controlled, stable output for the LC cells of the second LC layer in scenarios where no direct image modulation is necessary, ensuring consistent visual quality while preventing unintended artefacts.

Such a simplified manner of generating the drive signals has several technical benefits. First, when no conflicting light paths are detected, the system avoids unnecessary calculations for the LC cells in the second LC layer. By assigning the default drive signals to the first LC cell of the second LC layer, computational overhead is reduced, enabling faster real-time image processing.

Second, since the LC cells of the second LC layer do not require dynamic adjustment in non-conflict cases, the system reduces power usage by minimizing unnecessary LC activations. This contributes to energy-efficient operation, particularly in battery-powered or high-refresh-rate displays.

Third, the system directly computes drive signals for the first LC layer based only on the intensity of the corresponding image pixel, eliminating additional optimization steps. The default drive signals for the second LC layer act as a baseline configuration, ensuring stable and predictable light modulation.

Fourth, by applying the default drive signals to the LC cells of the second LC layer in non-conflict scenarios, the system maintains consistent light transmission properties, preventing unintended variations in brightness or polarization. This results in a more uniform display output with minimal processing artefacts.

Fifth, since the LC cells of the second LC layer operate with predefined settings in non-conflict cases, the system can prioritize processing resources for complex regions where conflicts occur. This reduces latency, making the display more responsive in real-time applications such as VR, AR, and dynamic 3D environments.

In order to validate the aforementioned example implementation, a spreadsheet-based simulation was developed. The simulation has been provided in a form of Table 1 below. The simulation models a horizontal scanline of lenticular-based pixel mapping, assuming a monochrome display where each LC cell in the first LC layer is subject to conflicts from both the left eye and the right eye of the same user. Each row in the simulation corresponds to a successive lenticular lens in the horizontal scanline, and the process follows a structured pixel-filling approach. Following assumptions and considerations were made:

(i) Views of the left eye and the right eye are mapped in separate columns to track how each eye perceives light from the same lenticular arrangement.

(ii) Each lenticular lens covers multiple LC cells of the first LC layer, and the right eye's perception is offset by two LC cells of the first LC layer from the left eye's perception.

(iii) The simulation iterates through pixel selection in a structured manner, ensuring that for each lenticular, pixel intensity values for the LC cells of the first LC layer are determined first, and pixel intensity values for the LC cells of the second LC layer follow based on previous selections.

(iv) The primary objective is to ensure that the left eye always perceives the intended colour, while conflicts with the right eye are mitigated through pixel selection and successive adjustments.

TABLE 1

| Left col | Right col | Lower pixel | Upper pixel | Actual left | Actual right | Diff L | Diff R |
|---|---|---|---|---|---|---|---|
| 1 | 1 | 1 | 0 | 1 | | 0 | 0 |
| 1 | 1 | 1 | 0 | 1 | | 0 | 0 |
| 1 | 1 | 1 | 0 | 1 | 1 | 0 | 0 |
| 0 | 0 | 1 | 1 | 0 | 0 | 0 | 0 |
| 0 | 0 | 1 | 1 | 0 | 0 | 0 | 0 |
| 0 | 0 | 1 | 1 | 0 | 0 | 0 | 0 |
| 1 | 0 | 0 | 1 | 1 | 0 | 0 | 0 |
| 1 | 0 | 0 | 1 | 1 | 0 | 0 | 0 |
| 1 | 0 | 1 | 0 | 1 | 0 | 0 | 0 |
| 0 | 1 | 1 | 1 | 0 | 1 | 0 | 0 |
| 0 | 1 | 0 | 0 | 0 | 1 | 0 | 0 |
| 0 | 1 | 0 | 0 | 0 | 1 | 0 | 0 |
| 1 | 0 | 1 | 0 | 1 | 0 | 0 | 0 |
| 0 | 1 | 1 | 1 | 0 | 1 | 0 | 0 |
| 1 | 0 | 0 | 1 | 1 | 0 | 0 | 0 |
| 0 | 1 | 0 | 0 | 0 | 1 | 0 | 0 |
| 0.75 | 0 | 0.75 | 0 | 0.75 | 0 | 0 | 0 |
| 0 | 0.25 | 0.25 | 1.75 | 0 | 0.25 | 0 | 0 |
| 0.8 | 0.8 | 0.75 | 0.05 | 0.8 | 0.8 | 0 | 0 |
| 1 | 0 | 1.25 | 1.75 | 1 | 0 | 0 | 0 |
| 0 | 0 | 0.75 | 1.25 | 0 | 0 | 0 | 0 |
| 0 | 0 | 1.25 | 0.75 | 0 | 0 | 0 | 0 |
| 0 | 0 | 0.75 | 1.25 | 0 | 0 | 0 | 0 |
| 1 | 1 | 1.25 | 1.75 | 1 | 1 | 0 | 0 |
| 1 | 1 | 0.75 | 0.25 | 1 | 1 | 0 | 0 |
| 1 | 1 | 1.25 | 1.75 | 1 | 1 | 0 | 0 |
| 0 | 0 | 0.75 | 1.25 | 0 | 0 | 0 | 0 |
| 0 | 0 | 1.25 | 0.75 | 0 | 0 | 0 | 0 |
| 0 | 0 | 0.75 | 1.25 | 0 | 0 | 0 | 0 |

In Table 1,

"Left col" represents an intended intensity value of the pixel as perceived by the left eye. Values range from 0 (black) to 1 (full brightness) in the case of the monochrome display.

"Right col" represents an intended intensity value of the pixel as perceived by the right eye.

"Lower pixel" represents an intensity of a given LC cell of the first LC layer that is positioned under a given lenticular lens. This is considered as a base pixel that will be seen by both the left eye and the right eye, unless modified by the second LC layer.

"Upper pixel" represents a modulation value applied by an LC cell of the second LC layer corresponding to the given lenticular lens. The second LC layer is used to fine-tune polarization and adjust pixel intensities to resolve conflicts.

"Actual left" represents a final output intensity perceived by the left eye after passing through both the stacked LC layers and the lenticular array. The final output intensity is calculated based on the combined effects of the intensity of the given LC cell of the first LC layer and the modulation value applied by the LC cell of the second LC layer.

"Actual right" represents a final output intensity perceived by the right eye after passing through both the stacked LC layers and the lenticular array.

"Diff L" represents a difference between the intended intensity value and an actual intensity value for the left eye. This is a measure of how accurately the intended left-eye pixel intensity was achieved. Ideally, this should be zero, meaning no deviation from the intended value.

"Diff R" represents a difference between the intended intensity value and an actual intensity value for the right eye. This is a measure of how accurately the intended right-eye pixel intensity was achieved.

Following key observations were made from the simulation:

(a) Assigning the intensity values to the LC cells of the first LC layer and the LC cells of the second LC layer in succession ensures that each eye perceives the correct intensity.

(b) Where a conflict occurs, the modulation value applied by the LC cells of the second LC layer compensates for previous intensity selections, ensuring that the sum of polarization changes results in the correct final intensity.

(c) The difference columns (namely, Diff L, Diff R) confirm that the intended image intensity is correctly reproduced, validating that the aforementioned method effectively resolves multi-user pixel conflicts.

Furthermore, optionally, when generating the drive signals, the at least one processor is configured to:

detect when the at least one user is a plurality of users, and when light emanating from a given LC cell of the first LC layer simultaneously passes through more than two LC cells of the second LC layer towards different eyes of different ones of the plurality of users; and when it is detected that the at least one user is a plurality of users, and that the light emanating from the given LC cell of the first LC layer simultaneously passes through more than two LC cells of the second LC layer towards the different eyes of the different ones of the plurality of users, generate drive signals for the given LC cell of the first LC layer and individual ones of the more than two LC cells of the second LC layer, based on corresponding images to be presented to the different eyes of the different ones of the plurality of users, whilst employing temporal multiplexing.

In the multi-user case, when the light from the given LC cell in the first LC layer passes through more than two LC cells in the second LC layer, directing light toward multiple users' eyes, temporal multiplexing can be employed to resolve conflicts. In this regard, the at least one processor is configured to cycle between different drive signals for the different ones of the plurality of users, ensuring that each user perceives the correct image without unwanted interference.

Different sets of images are displayed for different sets of eyes by employing temporal multiplexing. In this regard, a given set of images corresponding to a given set of eyes is displayed in a single frame. Accordingly, the drive signals for the first LC layer and second LC layer are generated so that only the given set of images are presented to the given set of eyes. It will be appreciated that the given set of eyes may or may not include both eyes of a same user.

Optionally, in such a case, the display device operates at a high refresh rate (for example, 240 Hz or higher) to ensure that frame switching is imperceptible to human vision. As an example, if there are three users, each viewing virtual content in a separate frame (namely, a separate set of images), a 240 Hz display device can allocate 80 Hz per user, maintaining smooth image presentation.

Additionally, optionally, the at least one processor is configured to allocate different priorities to different users based on at least one of: the relative locations of the eyes of the different ones of the plurality of users with respect to the image plane, a rate at which the relative location of the eyes is changing. In this regard, the at least one processor could be configured to adjust timing intervals to prioritize visibility for at least one of the plurality of users having the highest priority.

Temporal multiplexing in the multi-user case has several technical benefits. First, by sequentially directing light paths to different users' eyes in separate time slots, temporal multiplexing ensures that each user perceives only their intended image, eliminating crosstalk and ghosting artefacts that would arise from simultaneous light overlap.

Second, temporal multiplexing retains the full display resolution and brightness for each user, as light paths are selectively activated rather than blocked.

Third, the system can adapt in real-time to add or remove users without affecting the display's optical structure. The high refresh rate (for example, 240 Hz or higher) ensures that individual users do not perceive flickering or artefacts, as the switching frequency remains above human perceptual limits. This creates a smooth and comfortable viewing experience, even as users move dynamically.

Fourth, instead of computing complex per-pixel optimizations for all eyes simultaneously, the system processes a set of eyes in each time slot, reducing computational load per frame. The LC drive signals are efficiently managed, preventing unnecessary power consumption from excessive per-user signal corrections.

Moreover, optionally, the system further comprises an optical combiner arranged on an optical path of the display device and on an optical path of a real-world light field of a real-world environment. The optical combiner is employed to reflect the synthetic light field towards the eyes of the at least one user, whilst optically combining the real-world light field with the synthetic light field. The optical combiner could be implemented as at least one of: a lens, a mirror, a semi-transparent mirror, a semi-transparent film, a semi-transparent flexible membrane, a prism, a beam splitter, an optical waveguide, a polarizer. Optionally, a tilt angle of the optical combiner with respect to the image plane of the display device lies in a range of 10 degrees and 75 degrees.

Moreover, the optical combiner can be implemented as at least a part of a windshield or other windows of a vehicle. By "at least a part", it is meant that the optical combiner can also be implemented as an entirety of the windshield or the other windows. This allows the system to be implemented as a heads-up display (HUD) in a vehicle, providing real-time overlays of navigational information, user assistance alerts, and augmented reality elements, enhancing user situational awareness without obstructing the user's view.

For illustration purposes, there will now be described how various components of the system can be implemented. The at least one processor of the system controls an overall operation of the system, and is communicably coupled to the tracker and the display device. Optionally, the at least one processor of the system is implemented as a processor of the display device. Alternatively, optionally, the at least one processor of the system is implemented as a processor of a computing device that is communicably coupled to the display device. Examples of the computing device include, but are not limited to, a laptop, a desktop, a tablet, a phablet, a personal digital assistant, a workstation, and a console. Yet alternatively, optionally, the at least one processor of the system is implemented as a cloud server (namely, a remote server) that provides a cloud computing service.

Throughout the present disclosure, the term "tracker" refers to specialised equipment for detecting and/or following a location of eyes of a given user. The given user encompasses each individual one of the at least one user. Optionally, the tracker is implemented as at least one tracking camera. The at least one tracking camera may comprise at least one of: at least one visible-light camera, at least one infrared (IR) camera, at least one depth camera. Examples of a given visible-light camera include, but are not limited to, a Red-Green-Blue (RGB) camera, a Red-Green-Blue-Alpha (RGB-A) camera, a Red-Green-Blue-Depth (RGB-D) camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Examples of a given depth camera include, but are not limited to, a Time-of-Flight (ToF) camera, a light detection and ranging (LiDAR) camera, a Red-Green-Blue-Depth (RGB-D) camera, a laser rangefinder, a stereo camera, a plenoptic camera, a ranging camera, a Sound Navigation and Ranging (SONAR) camera. It will be appreciated that any combination of various different types of cameras (for example, such as the at least one visible-light camera, the at least one IR camera, and the at least one depth camera) may be utilised in the tracker. When different types of images captured by the various different types of tracking cameras are utilised, a location of the user's eyes can be determined highly accurately, as results obtained from one type of image can be used to refine results obtained from another type of image. Herein, these different types of images constitute tracking data collected by the tracker, and may be in the form of at least one of: visible-light images, IR images, depth images. It will be appreciated that the tracker tracks the eyes of the given user with a significantly high accuracy and precision, such that an error in determining the relative location may, for example, be minimised to within a tolerance range of approximately (+/−) 8 millimetres.

As mentioned earlier, the corresponding images to be presented to the different eyes of each individual one of the at least one user are generated or retrieved based on the relative locations of the different eyes with respect to the image plane. In some implementations, the at least one processor is configured to generate the corresponding images by employing a 3D model of at least one virtual object. Hereinabove, the term "virtual object" refers to a computer-generated object (namely, a digital object). Examples of the at least one virtual object may include, but are not limited to, a virtual navigation tool, a virtual gadget, a virtual message, a virtual entity, a virtual entertainment media, and a virtual information. The term "three-dimensional model" of the at least one virtual object refers to a data structure that comprises comprehensive information pertaining to the at least one virtual object. Such a comprehensive information is indicative of at least one of: a plurality of features of the at least one virtual object or its portion, a shape and a size of the at least one virtual object or its portion, a pose of the at least one virtual object or its portion, a material of the at least one virtual object or its portion, a colour and an optical depth of the at least one virtual object or its portion. The 3D model may be generated in the form of a 3D polygonal mesh, a 3D point cloud, a 3D surface cloud, a voxel-based model, or similar. Optionally, the at least one processor is configured to store the 3D model at a data repository that is communicably coupled to the at least one processor. The data repository may be implemented as a memory of the at least one processor, a cloud-based database, or similar. In other implementations, the at least one processor is configured to retrieve the corresponding images in a form of 2D user interface (UI) elements. A 2D UI element could pertain to, for example, a virtual navigation tool, a virtual gadget, a virtual message, a virtual entity, a virtual entertainment media, a virtual information, or similar.

In some implementations, the backlight unit is configured to emit the light having a polarization orientation that is different from the polarization orientation of the linear polarizer. In such implementations, the aforesaid step of controlling the LC cells to adjust the polarization of the light is performed by taking into consideration a difference between the polarization orientation of the light emitted by the backlight unit and the polarization orientation of the linear polarizer. As an example, the backlight unit may comprise at least one laser light source. It will be appreciated that light emitted by a laser light source is typically already polarized. One example of such laser light sources is semiconductor lasers (for example, such as laser diodes). In such an example, the at least one laser light source can be configured to emit the light having the polarization orientation that is different from the polarization orientation of the linear polarizer. Various ways to perform such configuring are well-known in the art.

A technical benefit of configuring the backlight unit to emit the light having the polarization orientation that is different from the polarization orientation of the linear polarizer is that an overall brightness of the display device is enhanced, as compared to an alternative implementation where another linear polarizer is arranged to polarize unpolarized light rays. This is because when the unpolarized light rays pass through the another linear polarizer, almost 50 percent of the brightness is lost. However, when the light emitted by the backlight unit is already polarized, there is no need to employ the another linear polarizer.

In other implementations, the display device further comprises another linear polarizer having another polarization orientation that is different from the polarization orientation of the linear polarizer, and wherein the first LC layer and the second LC layer are arranged between the linear polarizer and the another linear polarizer. Accordingly, the aforesaid step of controlling the LC cells to adjust the polarization of the light is performed by taking into consideration a difference between the another polarization orientation of the another linear polarizer and the polarization orientation of the linear polarizer. It will be appreciated that in such implementations, various components of the display device may be arranged (along the optical path) as follows:

backlight unit->another linear polarizer->first LC layer->multiscopic optical element->second LC layer->linear polarizer The polarization orientation of the linear polarizer and the another polarization orientation of the another linear polarizer can be implemented in various ways. Optionally, they are orthogonal to each other. As an example, one of the linear polarizer and the another linear polarizer may be a vertically oriented polarizer having a vertical polarization orientation, while another of the linear polarizer and the another linear polarizer may be a horizontally oriented polarizer having a horizontal polarization orientation. It will be appreciated that these polarization orientations are not limited to the vertical polarization orientation and the horizontal polarization orientation. It will also be appreciated that these polarization orientations need not be orthogonal to each other.

The first LC layer and the second LC layer may be made of a same LC material or different LC materials. Examples of such LC materials include, but are not limited to, twisted nematic (TN) LCs, TN LCs with positive or negative optical retardation (TN-PO or TN-NO), ferroelectric LCs (FLCs), and electrically controlled birefringence (ECB) LCs. LC molecules in a given LC layer (namely, the first LC layer or the second LC layer) can be oriented in an in-plane switching (IPS) arrangement or a vertical alignment (VA) arrangement. IPS and VA arrangements are well known in the art.

In some implementations, the image plane of the display device is an outermost surface of the display device from which the light emits. This is particularly a case when no optical combiner is used in the system. In other implementations, an optical combiner and/or other optical elements (for example, such as one or more mirrors, one or more lenses, or a combination thereof) of the system may be arranged on an optical path between the display device and the at least one user. In such implementations, the image plane is an imaginary image plane.

The present disclosure also relates to the method as described above. Various embodiments and variants disclosed above, with respect to the aforementioned first aspect, apply mutatis mutandis to the method.

In an implementation, the step of generating the drive signals comprises:

for a given LC cell of the first LC layer, determining a first LC cell of the second LC layer through which light emanating from the given LC cell of the first LC layer is passing towards a first eye of a given individual one of the at least one user;

detecting whether the light emanating from the given LC cell of the first LC layer simultaneously passes through a second LC cell of the second LC layer towards a second eye of the given individual one of the at least one user or a given eye of another individual one of the at least one user; and when it is detected that the light emanating from the given LC cell of the first LC layer simultaneously passes through the second LC cell of the second LC layer towards the second eye of the given individual one of the at least one user or the given eye of the another individual one of the at least one user, generating drive signals for the given LC cell of the first LC layer, the first LC cell of the second LC layer and the second LC cell of the second LC layer, based on a corresponding image to be presented to the first eye of the given individual one of the at least one user and another corresponding image to be presented to the second eye of the given individual one of the at least one user or the given eye of the another individual one of the at least one user.

The aforementioned conflict detection and resolution mechanism provides several technical benefits that enhance the accuracy, efficiency, and visual quality of the synthetic light field, as described earlier.

Optionally, the step of generating the drive signals for the given LC cell, the first LC cell and the second LC cell comprises:

determining, based on a first intensity value of a first pixel in the corresponding image to be presented to the first eye, a first output angle to be generated between a polarization orientation of the linear polarizer and a first polarization orientation of the light incident upon the linear polarizer after passing through the given LC cell and the first LC cell; and determining, based on a second intensity value of a second pixel in the another corresponding image to be presented to the second eye or the given eye, a second output angle to be generated between the polarization orientation of the linear polarizer and a second polarization orientation of the light incident upon the linear polarizer after passing through the given LC cell and the second LC cell;

wherein the drive signals for the given LC cell, the first LC cell and the second LC cell are generated based on the first output angle and the second output angle.

Such an intensity-based polarization control mechanism enhances image accuracy, depth perception, and crosstalk reduction by dynamically determining output angles based on the intensity values of corresponding image pixels. Additionally, it enables adaptive multi-user optimization, maintaining colour consistency and visual clarity across different viewing angles, making it particularly effective for high-fidelity multiscopic displays.

Moreover, optionally, the step of generating the drive signals comprises:
when it is detected that the light emanating from the given LC cell of the first LC layer does not simultaneously pass through any other LC cell of the second LC layer towards the second eye of the given individual one of the at least one user or any eye of the another individual one of the at least one user,
generating drive signals for the given LC cell of the first LC layer, based on a first intensity value of a first pixel in the corresponding image to be presented to the first eye; and
generating default drive signals for the first LC cell of the second LC layer.

Generating the default drive signals for the LC cells of the second LC layer in non-conflict scenarios enhances computational efficiency, power savings, image stability, and processing speed, ensuring a high-performance, low-latency multiscopic display.

Furthermore, optionally, the step of generating the drive signals comprises:
detecting when the at least one user is a plurality of users, and when light emanating from a given LC cell of the first LC layer simultaneously passes through more than two LC cells of the second LC layer towards different eyes of different ones of the plurality of users; and
when it is detected that the at least one user is a plurality of users, and that the light emanating from the given LC cell of the first LC layer simultaneously passes through more than two LC cells of the second LC layer towards the different eyes of the different ones of the plurality of users,
generating drive signals for the given LC cell of the first LC layer and individual ones of the more than two LC cells of the second LC layer, based on corresponding images to be presented to the different eyes of the different ones of the plurality of users, whilst employing temporal multiplexing.

Temporal multiplexing provides a scalable, flicker-free, and high-resolution solution for multi-user autostereoscopic displays, ensuring that each user receives a crosstalk-free, bright, and computationally efficient viewing experience.

Moreover, optionally, in the method, the width of the multiscopic cells of the multiscopic optical element lies within a predefined range from an integer multiple of the width of the LC cells in the second LC layer. This ensures that each multiscopic cell is proportionally aligned with a single LC cell or multiple LC cells (depending on the implementation), allowing for a structured and predictable optical pathway.

Additionally, optionally, the LC cells of the second LC layer are aligned with edges of the multiscopic cells of the multiscopic optical element. Aligning the LC cells of the second LC layer with the edges of the multiscopic cells enhances light path accuracy, minimizes crosstalk, improves contrast, simplifies drive signal computation, and increases scalability. This structured optical alignment contributes to higher image quality, improved computational efficiency, and a more robust multiscopic display.

Furthermore, optionally, in the method, the multiscopic optical element is a lenticular array, and wherein the display device further comprises a masking layer arranged between the multiscopic optical element and the second LC layer, the masking layer comprising a plurality of masks positioned at edges of respective ones of the plurality of multiscopic cells. The inclusion of the masking layer between the lenticular array and the second LC layer enhances light control, contrast, and directional accuracy while reducing crosstalk, ghosting, and computational complexity. This ensures a high-quality, immersive multiscopic display experience, with improved brightness, stability, and manufacturing tolerance.

Moreover, optionally, in the method, the display device further comprises a colour filter array arranged adjacent to the first LC layer. A technical benefit of such an arrangement of the CFA is that there is no sub-pixel light leakage in the display device, eliminating crosstalk and ghosting artefacts in the synthetic light field. The CFA enables full-colour image generation, enhances colour accuracy, reduces processing overhead, and prevents chromatic artifacts, ensuring optimal image quality in both multi-user and single-user viewing scenarios.

DETAILED DESCRIPTION OF THE DRAWINGS

FIG. 1A is a schematic illustration of a multiscopic display system 100 that integrates a multiscopic optical element between stacked liquid crystal layers, in accordance with an embodiment of the present disclosure. The multiscopic display system 100 comprises a tracker 102, a display device 104 and at least one processor, depicted as a processor 106. The display device 104 comprises a backlight unit 108, a linear polarizer 110, a first LC layer 112 and a second LC layer 114, and a multiscopic optical element 116. The linear polarizer 110 is arranged on an optical path of the backlight unit 108. The first LC layer 112 and the second LC layer 114 are arranged between the backlight unit 108 and the linear polarizer 110. The second LC layer 114 is in a proximity of the linear polarizer 110. Each of the first LC layer 112 and the second LC layer 114 comprises a plurality of LC cells (depicted as separate boxes). The multiscopic optical element 116 is arranged between the first LC layer 112 and the second LC layer 114, the multiscopic optical element 116 comprising a plurality of multiscopic cells (shown as separate lenticular lenses, for illustration purposes only).

The processor 106 is configured to:
determine a relative location of each eye 118a-118b of each individual one of at least one user with respect to an image plane 120 of the display device 104, by utilising the tracker 102;
generate or retrieve a corresponding image to be presented to each eye 118a-118b of each individual one of the at least one user, based on the relative location of each eye 118a-118b of each individual one of the at least one user with respect to the image plane 120; and
generate drive signals for the LC cells of the first LC layer 112 and the LC cells of the second LC layer 114, based on corresponding images to be presented to different eyes 118a-118b of each individual one of the at least one user, the relative location of each eye 118a-118b of each individual one of the at least one user with respect to the image plane 120, relative positions of the LC cells of the second LC layer 114 with respect to the multiscopic cells of the multiscopic optical element 116, and relative positions of the LC cells of the first LC layer 112 with respect to the multiscopic cells of the multiscopic optical element 116,
wherein the LC cells of the first LC layer 112 and the LC cells of the second LC layer 114 are controlled using the drive signals, to adjust a polarization of light passing therethrough, for producing a synthetic light field presenting the corresponding images to the different eyes 118a-118b of each individual one of the at least one user.

Figure 1B:
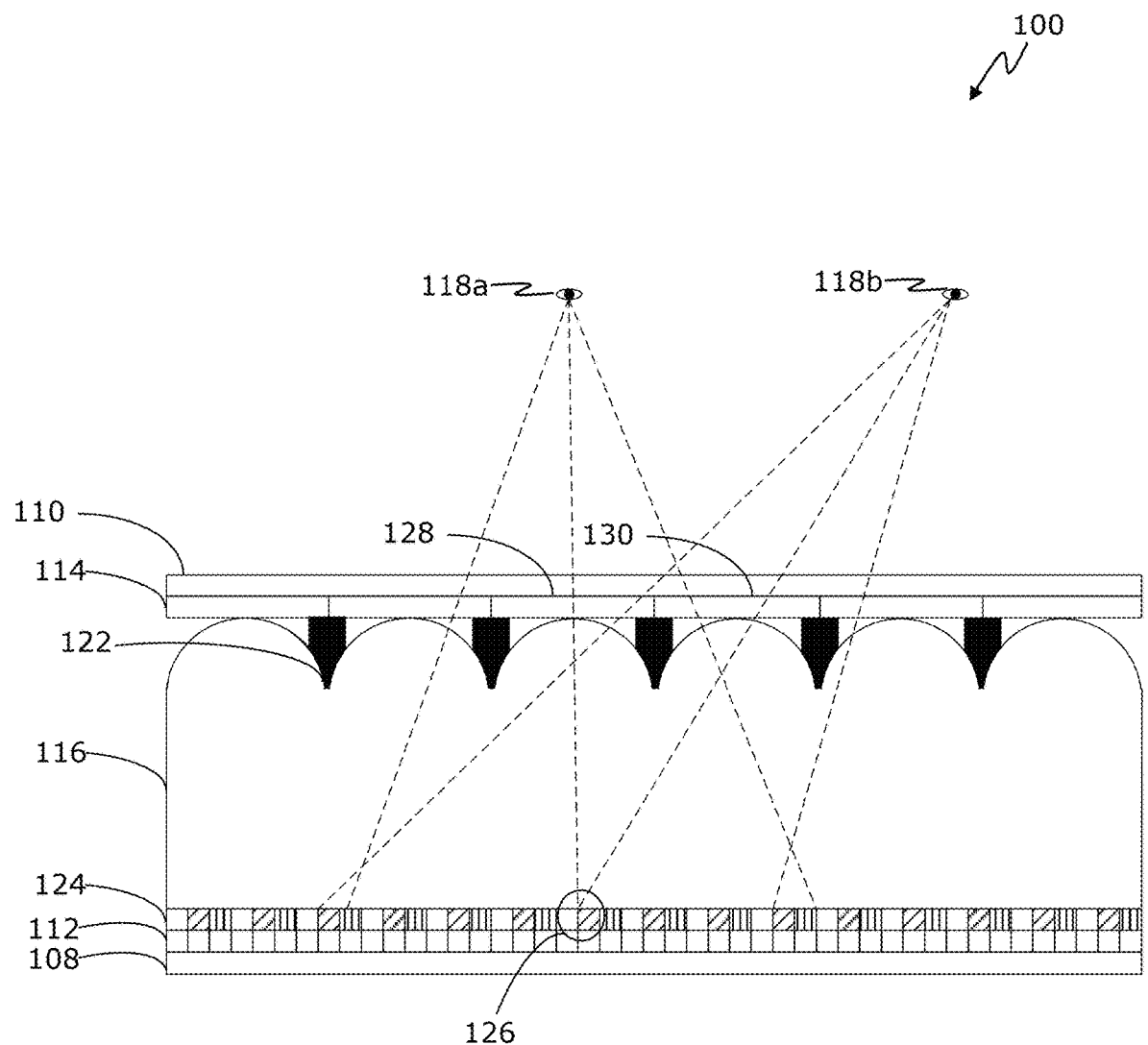
FIG. 1B illustrates an example implementation of the multiscopic display system, in accordance with an embodiment of the present disclosure.

Referring next to FIG. 1B, there is illustrated an example implementation of the multiscopic display system 100, in accordance with an embodiment of the present disclosure. Optionally, the system 100 further comprises a masking layer 122. Moreover, optionally, the system 100 further comprises a CFA 124.

In the example implementation, when generating the drive signals, the processor 106 is configured to:

for a given LC cell 126 of the first LC layer 112, determine a first LC cell 128 of the second LC layer 114 through which light emanating from the given LC cell of the first LC layer is passing towards a first eye 118a of a given individual one of the at least one user;

detect whether the light emanating from the given LC cell 126 of the first LC layer 112 simultaneously passes through a second LC cell 130 of the second LC layer 114 towards a second eye 118b of the given individual one of the at least one user (or a given eye of another individual one of the at least one user); and when it is detected that the light emanating from the given LC cell 126 of the first LC layer 112 simultaneously passes through the second LC cell 130 of the second LC layer 114 towards the second eye 118b of the given individual one of the at least one user (or the given eye of the another individual one of the at least one user), generate drive signals for the given LC cell 126 of the first LC layer 112, the first LC cell 128 of the second LC layer 114 and the second LC cell 130 of the second LC layer 114, based on a corresponding image to be presented to the first eye 118a of the given individual one of the at least one user and another corresponding image to be presented to the second eye 118b of the given individual one of the at least one user (or the given eye of the another individual one of the at least one user).

It may be understood by a person skilled in the art that FIGS. 1A-1B include simplified example implementations of the system 100, for sake of clarity, which should not unduly limit the scope of the claims herein. It is to be understood that the specific implementation of the system 100 is not to be construed as limiting it to specific numbers or types of trackers, display devices, backlight units, linear polarizers, LC layers, multiscopic optical elements and processors. The person skilled in the art will recognize many variations, alternatives, and modifications of embodiments of the present disclosure.

Figure 2:
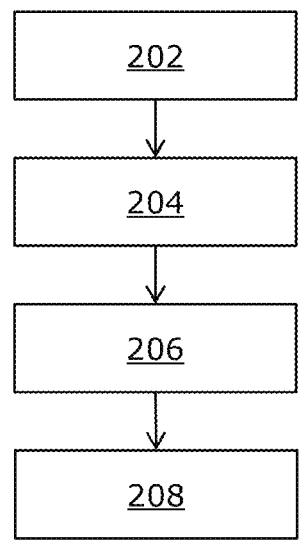
FIG. 2 depicts steps of a method for displaying via a multiscopic display system that integrates a multiscopic optical element between stacked LC layers, in accordance with an embodiment of the present disclosure.

Referring to FIG. 2, illustrated are steps of a method for displaying via a multiscopic display system that integrates a multiscopic optical element between stacked LC layers, in accordance with an embodiment of the present disclosure. At step 202, a relative location of each eye of each individual one of at least one user with respect to an image plane of a display device is determined. The display device comprises a backlight unit, a linear polarizer arranged on an optical path of the backlight unit, a first liquid crystal (LC) layer and a second LC layer arranged between the backlight unit and the linear polarizer, and a multiscopic optical element arranged between the first LC layer and the second LC layer, wherein the second LC layer is in a proximity of the linear polarizer, each of the first LC layer and the second LC layer comprising a plurality of LC cells, the multiscopic optical element comprising a plurality of multiscopic cells. At step 204, a corresponding image to be presented to each eye of each individual one of the at least one user is generated or retrieved, based on the relative location of each eye of each individual one of the at least one user with respect to the image plane. At step 206, drive signals are generated for the LC cells of the first LC layer and the LC cells of the second LC layer, based on corresponding images to be presented to different eyes of each individual one of the at least one user, the relative location of each eye of each individual one of the at least one user with respect to the image plane, relative positions of the LC cells of the second LC layer with respect to the multiscopic cells of the multiscopic optical element, and relative positions of the LC cells of the first LC layer with respect to the multiscopic cells of the multiscopic optical element. At step 208, the LC cells of the first LC layer and the LC cells of the second LC layer are controlled using the drive signals, to adjust a polarization of light passing therethrough, for producing a synthetic light field presenting the corresponding images to the different eyes of each individual one of the at least one user.

The aforementioned steps are only illustrative and other alternatives can also be provided where one or more steps are added, without departing from the scope of the claims herein.

The invention claimed is:

1. A multiscopic display system comprising:
   a tracker;
   a display device comprising:
      a backlight unit;
      a linear polarizer arranged on an optical path of the backlight unit;
      a first liquid crystal (LC) layer and a second LC layer arranged between the backlight unit and the linear polarizer, the second LC layer being in a proximity of the linear polarizer, each of the first LC layer and the second LC layer comprising a plurality of LC cells; and
      a multiscopic optical element arranged between the first LC layer and the second LC layer, the multiscopic optical element comprising a plurality of multiscopic cells; and
   at least one processor configured to:
      determine a relative location of each eye of each individual one of at least one user with respect to an image plane of the display device, by utilising the tracker;
      generate or retrieve a corresponding image to be presented to each eye of each individual one of the at least one user, based on the relative location of each eye of each individual one of the at least one user with respect to the image plane; and
      generate drive signals for the LC cells of the first LC layer and the LC cells of the second LC layer, based on corresponding images to be presented to different eyes of each individual one of the at least one user, the relative location of each eye of each individual one of the at least one user with respect to the image plane, relative positions of the LC cells of the second LC layer with respect to the multiscopic cells of the multiscopic optical element, and relative positions of the LC cells of the first LC layer with respect to the multiscopic cells of the multiscopic optical element,
      wherein the LC cells of the first LC layer and the LC cells of the second LC layer are controlled using the drive signals, to adjust a polarization of light passing therethrough, for producing a synthetic light field presenting the corresponding images to the different eyes of each individual one of the at least one user.

2. The multiscopic display system of claim 1, wherein when generating the drive signals, the at least one processor is configured to:
   for a given LC cell of the first LC layer, determine a first LC cell of the second LC layer through which light emanating from the given LC cell of the first LC layer is passing towards a first eye of a given individual one of the at least one user;
   detect whether the light emanating from the given LC cell of the first LC layer simultaneously passes through a second LC cell of the second LC layer towards a second eye of the given individual one of the at least one user or a given eye of another individual one of the at least one user; and
   when it is detected that the light emanating from the given LC cell of the first LC layer simultaneously passes through the second LC cell of the second LC layer towards the second eye of the given individual one of the at least one user or the given eye of the another individual one of the at least one user,
      generate drive signals for the given LC cell of the first LC layer, the first LC cell of the second LC layer and the second LC cell of the second LC layer, based on a corresponding image to be presented to the first eye of the given individual one of the at least one user and another corresponding image to be presented to the second eye of the given individual one of the at least one user or the given eye of the another individual one of the at least one user.

3. The multiscopic display system of claim 2, wherein when generating the drive signals for the given LC cell, the first LC cell and the second LC cell, the at least one processor is configured to:
   determine, based on a first intensity value of a first pixel in the corresponding image to be presented to the first eye, a first output angle to be generated between a polarization orientation of the linear polarizer and a first polarization orientation of the light incident upon the linear polarizer after passing through the given LC cell and the first LC cell; and
   determine, based on a second intensity value of a second pixel in the another corresponding image to be presented to the second eye or the given eye, a second output angle to be generated between the polarization orientation of the linear polarizer and a second polarization orientation of the light incident upon the linear polarizer after passing through the given LC cell and the second LC cell;
   wherein the drive signals for the given LC cell, the first LC cell and the second LC cell are generated based on the first output angle and the second output angle.

4. The multiscopic display system of claim 2, wherein when generating the drive signals, the at least one processor is configured to:
   when it is detected that the light emanating from the given LC cell of the first LC layer does not simultaneously pass through any other LC cell of the second LC layer towards the second eye of the given individual one of the at least one user or any eye of the another individual one of the at least one user,
      generate drive signals for the given LC cell of the first LC layer, based on a first intensity value of a first pixel in the corresponding image to be presented to the first eye; and
      generate default drive signals for the first LC cell of the second LC layer.

5. The multiscopic display system of claim 1, wherein when generating the drive signals, the at least one processor is configured to:
   detect when the at least one user is a plurality of users, and when light emanating from a given LC cell of the first LC layer simultaneously passes through more than two LC cells of the second LC layer towards different eyes of different ones of the plurality of users; and
   when it is detected that the at least one user is a plurality of users, and that the light emanating from the given LC cell of the first LC layer simultaneously passes through more than two LC cells of the second LC layer towards the different eyes of the different ones of the plurality of users,
      generate drive signals for the given LC cell of the first LC layer and individual ones of the more than two LC cells of the second LC layer, based on corresponding images to be presented to the different eyes of the different ones of the plurality of users, whilst employing temporal multiplexing.

6. The multiscopic display system of claim 1, wherein a width of the multiscopic cells of the multiscopic optical element lies within a predefined range from an integer multiple of a width of the LC cells in the second LC layer.

7. The multiscopic display system of claim 6, wherein the LC cells of the second LC layer are aligned with edges of the multiscopic cells of the multiscopic optical element.

8. The multiscopic display system of claim 1, wherein the multiscopic optical element is a lenticular array, and wherein the display device further comprises a masking layer arranged between the multiscopic optical element and the second LC layer, the masking layer comprising a plurality of masks positioned at edges of respective ones of the plurality of multiscopic cells.

9. The multiscopic display system of claim 1, wherein the display device further comprises a colour filter array arranged adjacent to the first LC layer.

10. A method comprising:
   determining a relative location of each eye of each individual one of at least one user with respect to an image plane of a display device, wherein the display device comprises a backlight unit, a linear polarizer arranged on an optical path of the backlight unit, a first liquid crystal (LC) layer and a second LC layer arranged between the backlight unit and the linear polarizer, and a multiscopic optical element arranged between the first LC layer and the second LC layer, wherein the second LC layer is in a proximity of the linear polarizer, each of the first LC layer and the second LC layer comprising a plurality of LC cells, the multiscopic optical element comprising a plurality of multiscopic cells;
   generating or retrieving a corresponding image to be presented to each eye of each individual one of the at least one user, based on the relative location of each eye of each individual one of the at least one user with respect to the image plane;
   generating drive signals for the LC cells of the first LC layer and the LC cells of the second LC layer, based on corresponding images to be presented to different eyes of each individual one of the at least one user, the relative location of each eye of each individual one of the at least one user with respect to the image plane, relative positions of the LC cells of the second LC layer with respect to the multiscopic cells of the multiscopic optical element, and relative positions of the LC cells of the first LC layer with respect to the multiscopic cells of the multiscopic optical element; and controlling the LC cells of the first LC layer and the LC cells of the second LC layer using the drive signals, to adjust a polarization of light passing therethrough, for producing a synthetic light field presenting the corresponding images to the different eyes of each individual one of the at least one user.

11. The method of claim 10, wherein the step of generating the drive signals comprises:

for a given LC cell of the first LC layer, determining a first LC cell of the second LC layer through which light emanating from the given LC cell of the first LC layer is passing towards a first eye of a given individual one of the at least one user;

detecting whether the light emanating from the given LC cell of the first LC layer simultaneously passes through a second LC cell of the second LC layer towards a second eye of the given individual one of the at least one user or a given eye of another individual one of the at least one user; and when it is detected that the light emanating from the given LC cell of the first LC layer simultaneously passes through the second LC cell of the second LC layer towards the second eye of the given individual one of the at least one user or the given eye of the another individual one of the at least one user, generating drive signals for the given LC cell of the first LC layer, the first LC cell of the second LC layer and the second LC cell of the second LC layer, based on a corresponding image to be presented to the first eye of the given individual one of the at least one user and another corresponding image to be presented to the second eye of the given individual one of the at least one user or the given eye of the another individual one of the at least one user.

12. The method of claim 11, wherein the step of generating the drive signals for the given LC cell, the first LC cell and the second LC cell comprises:

determining, based on a first intensity value of a first pixel in the corresponding image to be presented to the first eye, a first output angle to be generated between a polarization orientation of the linear polarizer and a first polarization orientation of the light incident upon the linear polarizer after passing through the given LC cell and the first LC cell; and determining, based on a second intensity value of a second pixel in the another corresponding image to be presented to the second eye or the given eye, a second output angle to be generated between the polarization orientation of the linear polarizer and a second polarization orientation of the light incident upon the linear polarizer after passing through the given LC cell and the second LC cell;

wherein the drive signals for the given LC cell, the first LC cell and the second LC cell are generated based on the first output angle and the second output angle.

13. The method of claim 11, wherein the step of generating the drive signals comprises:

when it is detected that the light emanating from the given LC cell of the first LC layer does not simultaneously pass through any other LC cell of the second LC layer towards the second eye of the given individual one of the at least one user or any eye of the another individual one of the at least one user, generating drive signals for the given LC cell of the first LC layer, based on a first intensity value of a first pixel in the corresponding image to be presented to the first eye; and generating default drive signals for the first LC cell of the second LC layer.

14. The method of claim 10, wherein the step of generating the drive signals comprises:

detecting when the at least one user is a plurality of users, and when light emanating from a given LC cell of the first LC layer simultaneously passes through more than two LC cells of the second LC layer towards different eyes of different ones of the plurality of users; and when it is detected that the at least one user is a plurality of users, and that the light emanating from the given LC cell of the first LC layer simultaneously passes through more than two LC cells of the second LC layer towards the different eyes of the different ones of the plurality of users, generating drive signals for the given LC cell of the first LC layer and individual ones of the more than two LC cells of the second LC layer, based on corresponding images to be presented to the different eyes of the different ones of the plurality of users, whilst employing temporal multiplexing.

15. The method of claim 10, wherein a width of the multiscopic cells of the multiscopic optical element lies within a predefined range from an integer multiple of a width of the LC cells in the second LC layer.

16. The method of claim 15, wherein the LC cells of the second LC layer are aligned with edges of the multiscopic cells of the multiscopic optical element.

17. The method of claim 10, wherein the multiscopic optical element is a lenticular array, and wherein the display device further comprises a masking layer arranged between the multiscopic optical element and the second LC layer, the masking layer comprising a plurality of masks positioned at edges of respective ones of the plurality of multiscopic cells.

18. The method of claim 10, wherein the display device further comprises a colour filter array arranged adjacent to the first LC layer.

* * * * *